United States Patent Office 2,988,050
Patented June 13, 1961

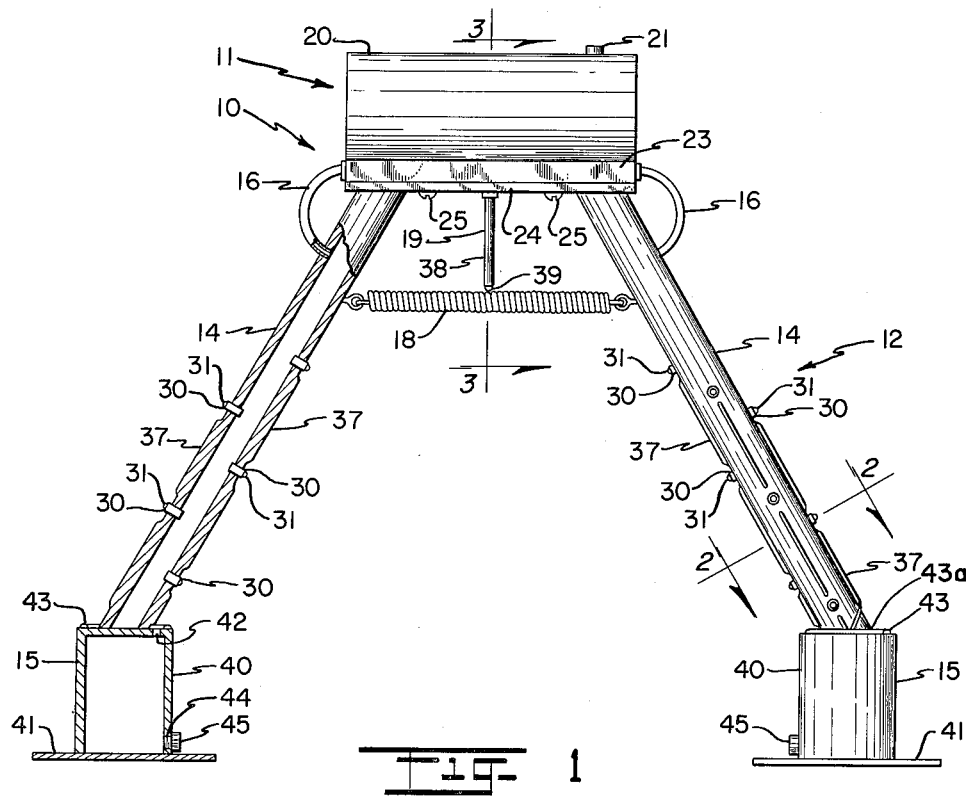
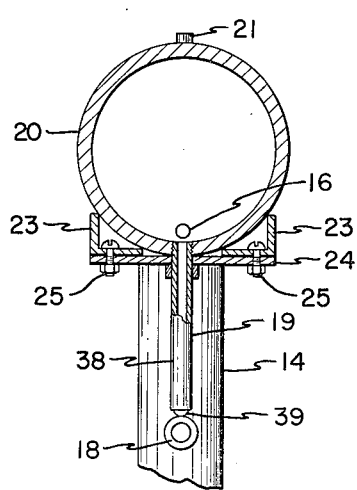
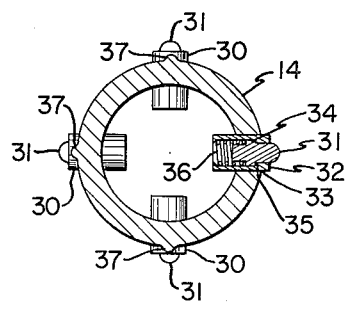
Fig. 1
Fig. 2
Fig. 3
INVENTOR.
ROBERT M. MINOCK

2,988,050
LIVESTOCK OILER
Robert M. Minock, 225 E. Maple Ave., Denver, Colo.
Filed June 16, 1958, Ser. No. 742,145
8 Claims. (Cl. 119—157)

This invention relates to an improvement in the treatment of livestock and more particularly relates to an improved means for application of insecticides and the like to livestock, especially cattle.

In the treatment of livestock it is customary to provide for a way of applying insecticides in which the animals may, by rubbing or otherwise contacting the surfaces of an applicator device, induce the flow of a controlled amount of the insecticides or similar materials from the applicator. For example, in the treatment of cattle, scratching surfaces may be provided on the applicator together with actuating means whereby when the cattle rub parts of their bodies against these scratching surfaces, the insecticide may be automatically released to saturate their bodies. And, in this respect, it is desirable to be able to treat a number of animals at one time, to make the surfaces easily accessible to cattle of various sizes and heights and to arrange the rubbing surfaces in such a way as to permit rubbing by the animal of any part of his body for the more thorough and complete application of the insecticide thereto. Additional factors to be considered in the construction and arrangement of such a unit are, of course, compactness, reliability and efficiency in operation in which the various elements of the applicator are of rugged construction and not easily damaged as the animals rub against them.

In accordance with the present invention, the above desirable features are incorporated in a unique way into the livestock oiler of the present invention wherein preferably a common source of supply may be utilized to deliver insecticides and the like to a number of applicator surfaces arranged to permit servicing of a number of animals of different sizes at the same time and in doing so to provide for the complete saturation of any part of the body without wasting the excess liquid released onto the applicator surfaces.

Accordingly, it is a principal object of the present invention to provide for a livestock oiler device conformable for servicing a number of animals of various heights and sizes at one time, to enable the automatic application of the oil or similar fluid material to any portion of their bodies, and to further enable reuse of any excess oil.

It is another object to provide for a simple and efficient device for the application of oil, such as insecticides and the like to animals, which may be actuated by animals of different sizes to supply a controlled amount of fluid to any portion of their bodies with little or no waste of the excess material and furthermore, wherein a minimum number of moving parts is required.

It is a further object to provide for a cattle oiler of simple, yet rugged, construction having a common source of supply which may be fed directly through a number of applicators inclining in predetermined relation therefrom in such a way as to enable a number of animals of different heights and sizes to withdraw the insecticide from the applicators at one time to any desired parts of the body, at a sufficient rate to insure complete saturation of the body areas and wherein a unique arrangement may be combined therewith for collecting any excess oil.

It is a still a further object to provide for the application of insecticides to cattle in which a plurality of applicators may be disposed in predetermined angular relationship to one another and in such a way as to be capable, individually and in combination, of servicing a number of cattle of different heights and sizes at one time; also, to be responsive to engagement with the various parts of their bodies to automatically apply the insecticides to those corresponding parts; and further to establish the increased supply of the insecticide to the cattle and to collect for reuse any excess amount of the insecticide released.

With the above and other objects in view, the novel combination and arrangement of parts will become more apparent from a consideration of the following description taken together with the drawings, in which:

FIGURE 1 is an elevational view of a preferred embodiment of the present invention with a portion thereof being broken away and shown in section;

FIGURE 2 is a sectional view taken on line 2—2 of FIGURE 1; and

FIGURE 3 is a sectional view taken on line 3—3 of FIGURE 1.

With more particular reference to the drawings there is shown in FIGURES 1-3 inclusive, by way of illustration and not limitation, a preferred embodiment of an applicator or dispensing unit 10 which is broadly comprised of a reservoir or liquid supply tank 11 disposed in elevated position on a frame 12, the frame 12 being formed essentially of a number of applicators each consisting of a hollow tube or conduit 14 supported at a predetermined angle on a pedestal 15. Also, an additional applicator in the form of a resilient spring member 18 may be supported between the tubes 14 in horizontal position beneath a centrally located valve 19, the valve 19 extending downwardly from the interior of the reservoir 11.

In the preferred form as shown, the unit 10 may be proportioned in size for the servicing of cattle and with the elements forming the unit being preferably of a heavy duty metal. The reservoir 11 serves as a common source of insecticide supply to each applicator 14 and for this purpose may consist of a generally cylindrical, elongate container 20 having an entry orifice 21 in the top to receive the insecticide. In order to support the container 20 in desired position, angle irons 23 may be attached to the forward and back underside of the container for seating and attachment of the container 20 on a horizontal plate 24 by suitable means, such as bolts 25. The liquid insecticide or similar material in the reservoir may then be fed directly into the conduits 14 to fill them to the desired level by means of auxiliary connecting tubes 16, the tubes 16 curving outwardly from each lower end of the reservoir 11, then downwardly and inwardly into the upper sections of the conduits 14. In this way liquid will be introduced into the tubes up to the level of the point of entry of the tubes 16 into the conduits 14 and will be maintained at this level, notwithstanding the gradual removal of liquid in the course of operation of the applicators.

In accordance with the present invention, any desired number of applicator tubes may be employed in the treatment of the cattle and are disposed in predetermined angular relation so that each one may present its entire peripheral surface for engagement with the bodies of the cattle and yet with sufficient spacing between the tubes to service a number of animals at one time. In the preferred embodiment, the use of two applicators is illustrated in which the conduits 14 are secured in desired angular relation by welding or otherwise suitably attaching their upper ends at a predetermined angle with respect to the bottom of the horizontal plate 24 and by welding their lower ends at a complementary angle with respect to the top surface of the pedestals 15.

To establish the controlled withdrawal of liquid from the applicators as the animals contact and rub against the exterior surfaces thereof, each applicator is provided with a number of actuating valves 30 disposed in staggered and spaced intervals throughout the length of each of the applicators 14. As shown in FIGURE 3, each valve 30 may be comprised preferably of a tapered stem 31 projecting outwardly through a sleeve 32 mounted in an aperture 33 in the wall of the applicator. The stem 31 includes a disc 34 which is normally outwardly biased to a closed position against an internal shoulder 35 in the sleeve 32 by a spring 36. Moreover, to encourage rubbing and scratching against the surfaces of the applicators 14, roughened striations or projections 37 may be provided on the exterior surface of the applicators adjacent to each of the valves. Thus, as the cattle or other animals rub against the roughened surfaces 37, they will engage perhaps one or several of the valves 30 so as to press the stems 31 inwardly, thus unseating the valve discs 33 against the pressure of the spring 36 to allow the contained insecticide to flow out through the sleeve onto the hides or other parts of the cattle.

As shown in FIGURE 3, the applicator defined by the resilient spring 18 is supplied with insecticide from the reservoir 11 through the valve 19. This valve V is similar to the valves 30 but of slightly greater diameter and includes a sleeve 38 projecting downwardly from the tank to a location directly over the spring 18 with a tapered stem 39 extending from the bottom of the sleeve into contact with the top of the spring 18. It will be evident that in response to upward positive movement of the spring 18 caused by cattle rubbing against it, the valve member will be unseated to release insecticide by gravity onto the resilient spring 18. As the insecticide is released it will then travel over the length and periphery of the spring in following the spiral elements of the spring so as to saturate any upper section of the animal's body in contact with the spring 18.

An additional feature of the present invention is the construction and arrangement of the pedestals 15 which serve as base support members for the applicators 14. Each of the pedestals 15 will be seen to comprise a closed, preferably cylindrical, receptacle 40 resting on a flat base plate 41. Each receptacle 40, in turn, has an opening of inlet 42 in the generally concave top 43a adjacent to the lower end of each applicator 14, formed by a raised flange portion 43 encircling the lower end of the applicator 14 and opening 42 so as to cause any fluid draining off of the lower end of the applicator into the opening. For periodic removal of the insecticide, an opening 44 is provided at the lower end of the receptacle with a plug 45 closing the opening 44.

With the parts arranged in the above manner, the cattle or other animals may move either between or astride the applicators, or rub along the sides of each applicator and, due to the angular disposition of each applicator, preferably at 45 degrees from the vertical, the animal may engage any part of the body with the applicator surfaces also. In large part due to the angular relationship of the applicators, together with the spacing of the valves 30, animals of different heights and sizes may make use of the device at one time and, with each tube completely filled with fluid, more than a sufficient amount of the insecticide may be released to completely saturate any particular area of the animal's body. At the same time, the pedestals 15 will serve to collect any of the insecticide which drains down the exterior surfaces of the applicators, and in this connection it will be noted that the striations 37 may be so arranged throughout the length of the applicators 14 as to somewhat constrain the draining of the liquid in a path following the angular disposition of the applicators so as to accumulate on the tops of the pedestals 15.

It will be further evident from the above that any desired number of applicator tubes may depend from one common source of supply with little variation from the preferred embodiment as described. Thus, in place of the pair of applicators as shown, three applicators may be arranged in tripodal fashion equally spaced in downward extension from the liquid supply tank 11 or any number more than three may be spaced at the desired angular relation so as to extend from a common source of supply.

It will therefore be understood that many modifications and changes may be made in the construction and arrangement of the parts without departing from the spirit of the present invention, as defined in the appended claims.

What is claimed is:

1. A dispensing unit for the application of insecticides and the like in the treatment of cattle comprising a liquid supply tank, a plurality of hollow, elongate applicator members inclining outwardly at a predetermined angle from said tank with an auxiliary tube curving downwardly from said tank into connection with each applicator member to supply and maintain the insecticide at a predetermined level therein, a plurality of valves carried at staggered and spaced intervals along the surfaces of said applicator members so arranged as to be engageable by cattle rubbing against said applicator members for the release of insecticide from said applicator member, a resilient spring supported between said applicator members and a valve member including a stem extending downwardly from said tank to release liquid onto said spring in response to upward movement of said spring against said stem, and a hollow base support member for each of said applicator members having a generally concave top surface provided with an inlet to receive the excess insecticide delivered by said plurality of valves, and an outlet at the lower end of each base support for the periodic removal of insecticide therefrom.

2. In the treatment of cattle, a dispensing unit for insecticides and the like comprising an insecticide supply tank, a plurality of generally tubular members including conducting means communicating with the insecticide within said tank to fill said tubular members to a predetermined level, each tubular member sloping downwardly and being directed outwardly at a predetermined angle relative to one another and to said tank, pressure activated valve members at spaced intervals along the surfaces of said members so arranged as to be releasable by cattle rubbing against said tubular members for the delivery of insecticide therefrom, receiving means at the base of each tubular member to receive excess insecticide delivered by said pressure actuated valve members, a horizontal flexible tension applicator supported between and adjacent to the supply tank end of said tubular members and valve means mounted between and in oil-transferring contact with said horizontal applicator and said tank for the the delivery of insecticide thereto.

3. In the treatment of cattle, a dispensing unit according to claim 2 wherein said pressure actuated valve members are disposed at spaced and staggered intervals along each of said tubular members.

4. In the treatment of cattle, a dispensing unit according to claim 2 in which each of said pressure actuated valve members includes a sleeve provided with an internal shoulder, said sleeve being mounted in an aperture in the tubular member, a tapered stem projecting outwardly through said sleeve, said stem including a disc, and a spring member positioned within said sleeve normally biasing said disc to a closed position against the internal shoulder on said sleeve.

5. In the treatment of cattle according to claim 2 wherein roughened projections are disposed on the exterior surface of each tubular member adjacent to each of said pressure actuated valve members to encourage rubbing and scratching against the surfaces of said tubular members.

6. In the treatment of cattle, a dispensing unit according to claim 2 wherein the receiving means for each tubular member includes a receptacle having a generally concave top adjacent to the lower end of each tubular member, an inlet in the concave top, and an outlet at the lower end of the receptacle to provide for the periodic removal of insecticide from each receiving means.

7. In a dispensing unit adapted for the application of insecticides and the like in the treatment of livestock wherein there is provided a liquid supply reservoir positioned on a frame defined by a plurality of downwardly extending insecticide applicator members having a plurality of pressure actuated liquid dispensing valves thereon together with conducting means communicating with the liquid within the reservoir to supply the liquid to the applicator members, the combination therewith of a horizontal applicator extending between a pair of adjacent applicator members in spaced relation below the liquid supply reservoir, said horizontal applicator being in the form of a coiled spring, and a valve member projecting downwardly from the liquid supply reservoir into yielding contact with the top surface of said spring, said valve member being constituted of an elongate sleeve communicating with the interior of the reservoir and projecting downwardly from the reservoir to a location directly over said spring and a tapered stem positioned in the lower end of said sleeve and projecting downwardly therefrom into contact with the top of said spring whereupon in response to upward movement of the spring caused by livestock rubbing against it, said stem will be unseated in an upward direction to cause release of insecticide by gravity flow onto said spring.

8. A dispensing unit for application of insecticides and the like in the treatment of livestock comprising an insecticide supply tank, a plurality of hollow, elongate applicator members inclining outwardly at a predetermined angle from said tank with conducting means communicating with the insecticide within said tank to fill said applicator members to a predetermined level, valve means spaced along the surfaces of said applicator members and being arranged to be releasable by animals rubbing against said applicator members for the delivery of insecticide therefrom, a horizontal applicator member extending between the upper ends of a pair of said elongate applicator members and being disposed in adjacent but spaced relation beneath said supply tank, said horizontal applicator member being in the form of a coiled spring, and a valve member projecting downwardly from said supply tank into yielding contact with the top surface of said horizontal applicator member, said valve member including an elongate sleeve communicating with the interior of said tank and projecting downwardly therefrom to a location directly over said horizontal applicator member and a tapered stem positioned in the lower end of said sleeve and projecting downwardly therefrom into contact with the top of said horizontal applicator member whereupon in response to upward movement of said horizontal applicator member caused by animals rubbing against it, said stem will be unseated in an upward direction to cause release of insecticide by gravity flow onto said horizontal applicator member.

References Cited in the file of this patent

UNITED STATES PATENTS

| | | |
|---|---|---|
| 1,216,081 | Cox | Feb. 13, 1917 |
| 1,627,516 | Larson | May 3, 1927 |
| 2,581,026 | Kirk | June 1, 1952 |
| 2,825,305 | Tatge | Mar. 4, 1958 |

FOREIGN PATENTS

| | | |
|---|---|---|
| 779,581 | Great Britain | July 24, 1957 |